(12) United States Patent  
Kojovic (10) Patent No.: US 10,739,238 B2  
(45) Date of Patent: Aug. 11, 2020

(54) APPARATUS AND METHOD FOR DETERMINING THE HARDNESS OF A GRANULAR MATERIAL

(71) Applicant: SimSAGe Pty Ltd, Indooroopilly (AU)

(72) Inventor: Toni Kojovic, Chapel Hill (AU)

(73) Assignee: SimSAGe Pty Ltd., Indooroopilly, QLD (AU)

( * ) Notice: Subject to any disclaimer, the term of this patent is extended or adjusted under 35 U.S.C. 154(b) by 290 days.

(21) Appl. No.: 15/758,318

(22) PCT Filed: Oct. 15, 2016

(86) PCT No.: PCT/IB2016/001591  
§ 371 (c)(1),  
(2) Date: Mar. 7, 2018

(87) PCT Pub. No.: WO2017/064562  
PCT Pub. Date: Apr. 20, 2017

(65) Prior Publication Data  
US 2018/0252626 A1     Sep. 6, 2018

Related U.S. Application Data

(60) Provisional application No. 62/241,852, filed on Oct. 15, 2015.

(51) Int. Cl.  
*G01N 3/40*   (2006.01)  
*G01N 3/303*  (2006.01)

(52) U.S. Cl.  
CPC .............. *G01N 3/40* (2013.01); *G01N 3/303* (2013.01); *G01N 2203/0087* (2013.01); *G01N 2203/0284* (2013.01)

(58) Field of Classification Search  
CPC ... G01N 2033/0077; G01N 2291/0289; G01N 3/565; G01N 2015/0261; G01N 3/34; G01N 3/303  
See application file for complete search history.

(56) References Cited

U.S. PATENT DOCUMENTS 3,266,289 A    8/1966  Stamy  
3,580,060 A *  5/1971  Huskey ............ G01N 3/40  
                                           73/816

(Continued)

FOREIGN PATENT DOCUMENTS

WO    2011120092 A1    10/2011

OTHER PUBLICATIONS

Shi et al., "Development of a rapid particle breakage characterisation device", May 4, 2009, Minerals Engineering, 602-612 (Year: 2009).*

(Continued)

*Primary Examiner* — Tran M. Tran  
(74) *Attorney, Agent, or Firm* — Temmerman Law; Mathew J. Temmerman (57) ABSTRACT

An apparatus and method for determining the hardness of a granular material, comprises a base plate member, a sample cup for holding the granular material, an upper plate member, a crusher assembly and a crusher hammer release mechanism. The base plate member includes an upper surface with a recess for holding the sample cup. The upper plate member is positioned above and separated from the base plate member utilizing at least one separator post. The crusher assembly includes a crusher shaft, a crusher weight, a crusher hammer and a linear roller bearing having a retaining ring configured to slidably engage the crusher shaft through a conduit with the crusher weight and the crusher hammer positioned above and below the upper plate member respectively. The crusher hammer release mechanism includes a pair of levers operably connected to a latch cable having a latch pin that runs through a compression spring.

22 Claims, 6 Drawing Sheets

(56) References Cited

U.S. PATENT DOCUMENTS

| | | | | |
|---|---|---|---|---|
| 3,859,841 A * | 1/1975 | Evans | G01N 3/303 | 73/11.04 |
| 4,054,050 A * | 10/1977 | Reid | G01N 3/14 | 73/806 |
| 4,393,717 A * | 7/1983 | Mason | G01B 7/06 | 73/821 |
| 4,409,843 A * | 10/1983 | Urban | A61J 7/0007 | 225/103 |
| 4,703,647 A * | 11/1987 | Eckhoff | G01N 3/40 | 241/6 |
| 4,799,375 A * | 1/1989 | Lally | G01N 3/30 | 73/12.09 |
| 4,813,287 A * | 3/1989 | Walzel | G01N 33/445 | 73/835 |
| 5,090,249 A * | 2/1992 | Bielewicz | G01N 3/08 | 73/822 |
| 5,209,124 A * | 5/1993 | Graudejus | A24C 5/34 | 73/78 |
| 5,392,633 A * | 2/1995 | Morris | B02C 4/30 | 73/7 |
| 5,567,867 A * | 10/1996 | Nazar | G01M 7/08 | 173/90 |
| 5,717,144 A * | 2/1998 | Dunaway | G01N 3/08 | 73/818 |
| 5,824,880 A | 10/1998 | Burwell et al. | | |
| 5,827,974 A * | 10/1998 | Nussinovitch | G01N 3/08 | 73/821 |
| 5,959,198 A * | 9/1999 | Pollok | G01N 3/52 | 73/12.06 |
| 6,035,716 A * | 3/2000 | Beekman | G01N 3/565 | 73/579 |
| 6,173,601 B1 * | 1/2001 | Beekman | G01N 3/565 | 73/7 |
| 6,389,876 B1 * | 5/2002 | Tanimura | G01N 3/06 | 73/12.01 |
| 6,848,293 B2 * | 2/2005 | DeRuiter | G01M 7/08 | 73/12.13 |
| 6,892,564 B2 * | 5/2005 | Ishikawa | G01N 3/303 | 73/12.06 |
| 7,137,285 B2 * | 11/2006 | Stroppiana | G01N 3/48 | 73/12.13 |
| 7,275,446 B2 * | 10/2007 | Benea | G01N 3/24 | 73/824 |
| 7,367,214 B2 * | 5/2008 | Goyal | G01N 3/303 | 73/12.09 |
| 7,549,315 B2 * | 6/2009 | Bulled | G01N 3/10 | 73/11.01 |
| 7,562,583 B2 * | 7/2009 | Conway | G01N 3/08 | 73/818 |
| 7,900,498 B1 * | 3/2011 | Ratcliffe | G01L 5/0052 | 73/12.01 |
| 7,900,499 B2 * | 3/2011 | Zhang | G01N 3/303 | 73/12.01 |
| 8,081,305 B2 * | 12/2011 | Azimi | G01J 3/02 | 250/339.08 |
| 8,271,236 B2 * | 9/2012 | Shi | G01N 3/303 | 703/2 |
| 8,272,247 B2 * | 9/2012 | Kojovic | B02C 19/0025 | 73/12.05 |
| 2004/0261493 A1 * | 12/2004 | Lee | G01N 3/303 | 73/12.09 |
| 2008/0060444 A1 | 3/2008 | Conway et al. | | |
| 2009/0199625 A1 | 8/2009 | Kojovic et al. | | |
| 2011/0247392 A1 * | 10/2011 | Cruz | G01N 3/56 | 73/7 |

OTHER PUBLICATIONS

Mwanga et al., "Testing of Ore Comminution Behavior in the Geometallurgical Context—A Review", May 19, 2015, Minerals 2015 (Year: 2015).*

Tavaves et al., "Modeling Breakage Rates of Coarse Particles in Ball Mills", Apr. 28, 2009, Minerals Engineering, 650-659 (Year: 2009).*

* cited by examiner

APPARATUS AND METHOD FOR DETERMINING THE HARDNESS OF A GRANULAR MATERIAL

RELATED APPLICATIONS

This application is a 371 Application based on and claims priority to International Patent Application No. PCT/IB2016/001591 filed Oct. 15, 2016, which claims priority to United States Provisional Patent Application 62/241,852, filed Oct. 15, 2015. These patent applications are incorporated herein in their entirety as if set out in full.

BACKGROUND OF THE DISCLOSURE

Technical Field of the Disclosure

In the field of mineral processing, mining operations typically extract very small quantities of a desired mineral from large quantities of rock. To make such enterprises profitable, a mining operation must take into account both the amount of mineral present in the ground and the hardness of the rock in which it is found. To extract the desired mineral will typically require the rock to be broken to a degree necessary to extract the mineral. This is an energy intensive process and therefore an understanding of the hardness of the host rock is critical to evaluate the financial feasibility of mining the host rock to extract the valuable mineral. The present embodiment relates in general to rock hardness testing devices and methods. More specifically, the present disclosure relates to an apparatus and method for testing the breakage response of a granular material under single particle, constant input, breakage energy conditions to facilitate the rapid determination of the crushing/impact hardness of the granular material; and to accomplish this within a greatly reduced time frame and at a lower cost basis than is currently available.

Description of the Related Art

Rock hardness testing plays a vital role in determining the energy required during blasting, crushing and grinding in any mining process. The final selection of the circuit for processing of the ores is determined based on the type of rocks that will be mined, the quantity of valuable minerals present and the hardness or strength of the host rocks. Various types of rock that may be mined range from hard rocks such as granites and dolomites to soft rocks such as sandstones and shale. Hardness is a reflection of the nature of the material capacity to resist pressure, grinding and so on. Mineral processing methods for different ores (base metals, iron, alumina, platinum, etc.) vary significantly, as do the energy requirements and the capability for energy consumption reduction. All mineral and rock hardness testing methods have certain drawbacks. In the case of the Mohs hardness estimating method, the hardness of minerals such as talc, gypsum, calcite, fluorite, apatite, feldspar, quartz, topaz, corundum, and diamond is measured by nicking or engraving the mineral surface. However, this hardness detection, analysis, and calculation method may not provide generally accurate test results and can greatly reduce the practical application of hardness parameters.

Various devices or methods for estimating rock hardness using single particle breakage tests are known in the art. However, these require obtaining a sample (from drill core or fragments) and transporting these samples to a laboratory for testing, which can be time-consuming and expensive. This method for determining rock hardness also has considerable application drawbacks. For example, accurate hardness testing is difficult during a field test; the sample mass required typically exceeds 2 kg; the time to complete the test can take hours to days depending on the test method selected; and transportation over a long distance of samples to licensed testing laboratories can be problematic both in terms of logistics and in time loss. Then there is the delay time in having results reported back to the site which can take up to 14 days or more, depending on the number of samples. Some traditional apparatuses do not include a means to hold the sample materials to be crushed and collect the fine particles formed during the crushing operation.

One of the existing single particle tests for measuring particle breakage properties describes a twin-pendulum apparatus that comprises a frame mounted on a base and extending up therefrom. A rebound pendulum with a block towards its lower end is centrally mounted below a frame in a fixed position and does not move. A swinging impact pendulum is also mounted from the frame and swings like a pendulum below the frame. A rock particle to be tested is positioned on an impact face of the rebound pendulum using adhesive tape. The impact pendulum of set weight is lifted up to a set height and then released such that it swings down and then collides with the rebound pendulum. The sample rock on the impact face of the rebound pendulum is struck by the impact pendulum and broken into small particles. The broken particles fall into a collection box where they can be collected and analyzed. However, the apparatus does not provide a reliable estimate of the rock hardness index nor is the method amenable to rapid testing given the time-consuming testing protocol. Moreover, such an apparatus requires a pneumatic system to release the pendulum to impact the sample rock.

Recognizing the deficiencies of the twin-pendulum test, a drop weight test (DWT) device was developed and has been widely used for over twenty years. The DWT test results can be modelled to predict the distribution of broken particles as a result of a particle undergoing an impact through the following equation:

$$t_{10} = A(1 - e^{-b \cdot Ecs})$$

where: $t_{10}$ is a size distribution 'fineness' index defined as the percent by weight of the initial mass of particles passing through a screen having an opening that is one tenth of the initial mean particle size of the test particles; $E_{cs}$ is the specific comminution energy (kWh/t); and A and b are ore impact breakage parameters determined from DWT results.

The index A*b has become well known in the mining industry as a reliable indicator of impact ore hardness and widely known as ore comminution test index, which essentially describes the rate at which finer particles are produced ($t_{10}$) for a set amount of specific energy ($E_{cs}$). The above equation for $t_{10}$ is embedded in mathematical models of crushers and grinding mills, enabling the prediction of the product size distribution from the breakage of any particle, using the underlying relationships between $t_{10}$ and key points on the full size distribution curve (established from an extensive single particle breakage database). That is, the mathematical model only needs to account for the Ecs and the ore parameters A and b to generate the product size distribution of a rock extracted from the ore for a given breakage event. However, this model provides a scattered plot due to the particle size effect. This 'average' set of A and b parameters used in the model assumes that particles of different sizes would be broken in the same way when subjected to the same impact energy. However, this assumption is questionable, particularly when the equation is used by a mill where the feed may contain particles from 200 mm down to less than 1 mm. Though the DWT as described above has become an industry standard in ore characterization, the device has limitations in meeting the emerging needs of comminution research, specifically the response of rocks to low energy repetitive impacts.

Recognizing these deficiencies, the industry developed a new breakage model incorporating the effect of particle size, and a new breakage characterization testing device, called the rotary breakage tester, which allows rapid testing of particle breakage under high energy single impact and low energy repetitive impact conditions. However, even the use of the rotary breakage tester is very time-consuming and costly, and as with the other prior art, is incapable of rapid testing of rock hardness in the field.

Therefore, there is a need for a portable rapid and inexpensive field testing apparatus and a method which would provide a consistent, input breakage energy measurement in a single impact mode within a greatly reduced time frame, in order to facilitate the rapid determination of the crushing/impact hardness of a rock either at site or under laboratory conditions. Such an apparatus would provide a reliable estimate of the hardness or breakage index (HDI) for a sample of rock extracted from an ore, using only a single impact energy and would take less than 5 minutes per sample. Such an apparatus is also suitable for performing repetitive impacts and providing accurate test results. Such a needed device would not require electricity, compressed air or hydraulics to operate and would use gravity as the source of input breakage energy. This apparatus would be easily and conveniently transported to a point of testing without the need to send the samples to a licensed laboratory for testing and data processing, thereby saving time and shipping charges. Such an apparatus would include an automated drop, lifting and dis-engaging mechanism to alleviate the possibility of repetitive stress injuries to technicians employed to run a high volume of tests each day. Further, this apparatus would include a means to hold the sample materials to be crushed thereby preventing the sample material from escaping upon impact. The means would also include a handle that allows a user to easily remove the material from the apparatus after use. This apparatus would allow a determination of hardness of the rock on a very small set of fragments from every drill core interval on site in parallel to assaying the same samples, and provides data density on hardness more rapidly and accurately than currently provided through conventional methods. This apparatus and method would allow much better definition of the rocks in the ore deposit in terms of crushing type hardness. Finally, this apparatus would allow rapid testing of rock breakage, preferably under single-impact and low-energy impact conditions, and would provide an accurate rate at which the smaller particles are produced at a set amount of specific energy. This same apparatus could be used in repetitive single-impact and low-energy impact conditions, or single-impact high-energy conditions if the rock size is reduced to below 10 mm. The present embodiment overcomes the existing shortcomings in this area by accomplishing these objectives.

SUMMARY OF THE DISCLOSURE

To minimize the limitations found in the prior art, and to minimize other limitations that will be apparent upon the reading of the specifications, the preferred embodiment of the present invention provides an apparatus and a method for determining the hardness or breakage index (HDI) of a rock.

The apparatus comprises a base plate member, a sample cup, an upper plate member, a crusher assembly and a crusher hammer release mechanism. The base plate member includes an upper surface having a recess thereon. The base plate member is placed over a flat surface for use. The sample cup, which holds the sample of the granular material to be crushed, is placed in the recess on the upper surface of the base plate member. The sample cup includes a handle attached to a cup portion having a flat base that fits into the recess. The upper plate member includes a top surface, a bottom surface and a conduit attached to the top surface at a borehole formed therethrough. The upper plate member is positioned above the base plate member and separated from the base plate member utilizing at least one separator post. The at least one separator post is fastened at the bottom surface of the upper plate member and at the upper surface of the base plate member utilizing at least one first fastening means. The crusher assembly includes a crusher shaft having an upper end and a lower end, a crusher weight fastened to the upper end of the crusher shaft, a crusher hammer fastened to the lower end of the crusher shaft and a linear roller bearing with a retaining ring positioned inside the conduit. The crusher hammer is fastened to the lower end of the crusher shaft using at least one second fastening means. The crusher shaft is slidable, received in and engaged through the conduit using the linear roller bearing and the retaining ring in such a way that the crusher weight is positioned above the top surface of upper plate member and the crusher hammer is positioned below the bottom surface of the upper plate member. The crusher hammer is attached to a crusher hammer head using at least one third fastening means. A cushion ring is positioned between the crusher hammer cap and the upper plate member to reduce the noise formed when the crusher shaft slides along the linear roller bearing. The crusher hammer release mechanism includes a pair of levers operably connected to a latch cable having a latch pin that runs through a compression spring. The pair of levers includes a first lever attached to one side of the upper plate member using a first lever bracket and a second lever attached to other side of the upper plate member using a second lever bracket. The first lever is attached to the first lever bracket using at least one fourth fastening means and the first lever bracket is attached to one side of the upper plate member using at least one fifth fastening means. The second lever is attached to the second lever bracket using the at least one fourth fastening means and the second lever bracket is attached to the other side of the upper plate member using the at least one fifth fastening means.

In one embodiment, the method for determining the hardness of a granular material is described. The granular material is selected from a group consisting of: cobblestones, rocks, mineral rocks, gravels and rock fragments. The method is used to determine the hardness of the granular material which is produced from the crushed rock extracted from the ore. The method comprises the steps of: providing an apparatus having a base plate member, a sample cup, an upper plate member, a crusher assembly and a crusher hammer release mechanism; Pre-screening the granular materials to be tested into a narrow size fraction, by mass and size to eliminate outliers; Then measuring and noting the weight and size of each granular material used in the crushing operation; Placing the granular material in the sample cup and positioning the sample cup in the recess on the upper surface of the base plate member; Pulling the pair of levers to slide the crusher shaft through the conduit to drop the crusher hammer on the granular material, thereby breaking the granular material into a finer material; Manually lifting the crusher shaft back to its starting position and removing the crushed fine particles from the apparatus by holding the handle of the sample cup containing the crushed fine particles from the base plate member; Then determining the weight of the crushed fine materials collected in the sample cup; Removing the crushed fine particles from the sample cup and presorting the crushed fine particles according to the fineness of the materials by sieving the crushed fine particles using an appropriate sieve for about between 30 seconds and 3 minutes (preferably 60 seconds) with a sieve of 1/10th the size of the initial rock crushed; Repeating the process for more samples of the granular material, preferably, repeated at least 10 times; Calculating the size distribution of the crushed fine materials (using multiple sieves) or fineness index ($t_{10}$) using the value of the mass of the undersize crushed fine materials on one sieve using the following equation:

$$t_{10} = 100 \times \frac{M_{u/size}}{M_{feed}} \%$$

where $M_{u/size}$ represents the mass of the undersize crushed fine materials smaller than a target sieve which is one tenth the size of the initial rock crushed and $M_{feed}$ represents the total mass of the granular material placed in the sample cup, the crushed fine material, those that are small enough to have passed through the sieve are "undersize", and other crushed material too large to pass through the sieve are "oversize"; then calculating the specific energy which depends on the mass of the granular material, gravity, the height and mass of the crusher hammer using the following equation:

$$Ecs = \frac{MgH}{m}$$

where M represents a mass of the crusher hammer (in kilograms); g represents the gravitational constant (9.8 m/s$^2$); H represents a height of the crusher hammer above the base plate member (in meters); and m represents the mass of the granular material and calculating the hardness or breakage index (HDI) for the granular material using the following equation:

$$HDI = \frac{t_{10}}{Ecs}$$

where $t_{10}$ represents a size distribution of the crushed finer particles or fineness index and Ecs represents a mass specific breakage energy expressed in kWh/t.

A first objective of the present invention is to provide a portable, rapid and inexpensive field testing apparatus that would provide a constant input breakage energy in a single impact mode within a greatly reduced time frame for facilitating rapid determination of the crushing/impact hardness of a granular material.

A second objective of the present invention is to provide a cost-effective apparatus that can be easily and conveniently transported to a point of testing without the need to send samples to a licensed laboratory for testing and data processing, thereby saving time and shipping charges.

A third objective of the present invention is to provide an apparatus that would facilitate the use of an automated drop lifting and dis-engaging mechanism to alleviate or reduce the possibility of repetitive stress injuries to technicians employed to run a high volume of tests each day.

A fourth objective of the present invention is to provide an apparatus that would include a means to hold the sample materials to be crushed thereby preventing the granular material from escaping upon impact.

A fifth objective of the present invention is to provide an apparatus that would include replaceable wear parts at impact surfaces.

Another objective of the present invention is to provide an apparatus that can be employed at a mining site for routine sample testing of feed to a mill, as a monitoring tool, or to check that the mill performance is in line with expectations based on historical trends.

Still another objective of the present invention is to provide an apparatus that would allow determination of hardness on a very small set of fragments from every drill core interval on site in parallel to assaying the same samples; and provide data density on hardness more quickly and accurately than can be provided through existing, conventional methods.

Yet another object of the present invention is to provide an apparatus that would produce low noise and low dust due to low specific energy usage, and does not require electricity, compressed air or hydraulics to operate.

Still yet another object of the present invention is to provide an apparatus that allows rapid testing of granular material breakage under high-energy, single-impact and low-energy repetitive impact conditions; and provides an accurate rate at which the finer particles are produced at a set amount of specific energy.

Another object of the present invention is to provide an apparatus that applies a single impact mode of breakage on consecutive pre-screened fragments and combined with the one screen test post breakage of all fragments, will take less than 5 minutes to estimate the hardness index (HDI) for a sample of 10 to 20 fragments at point of testing.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about' means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
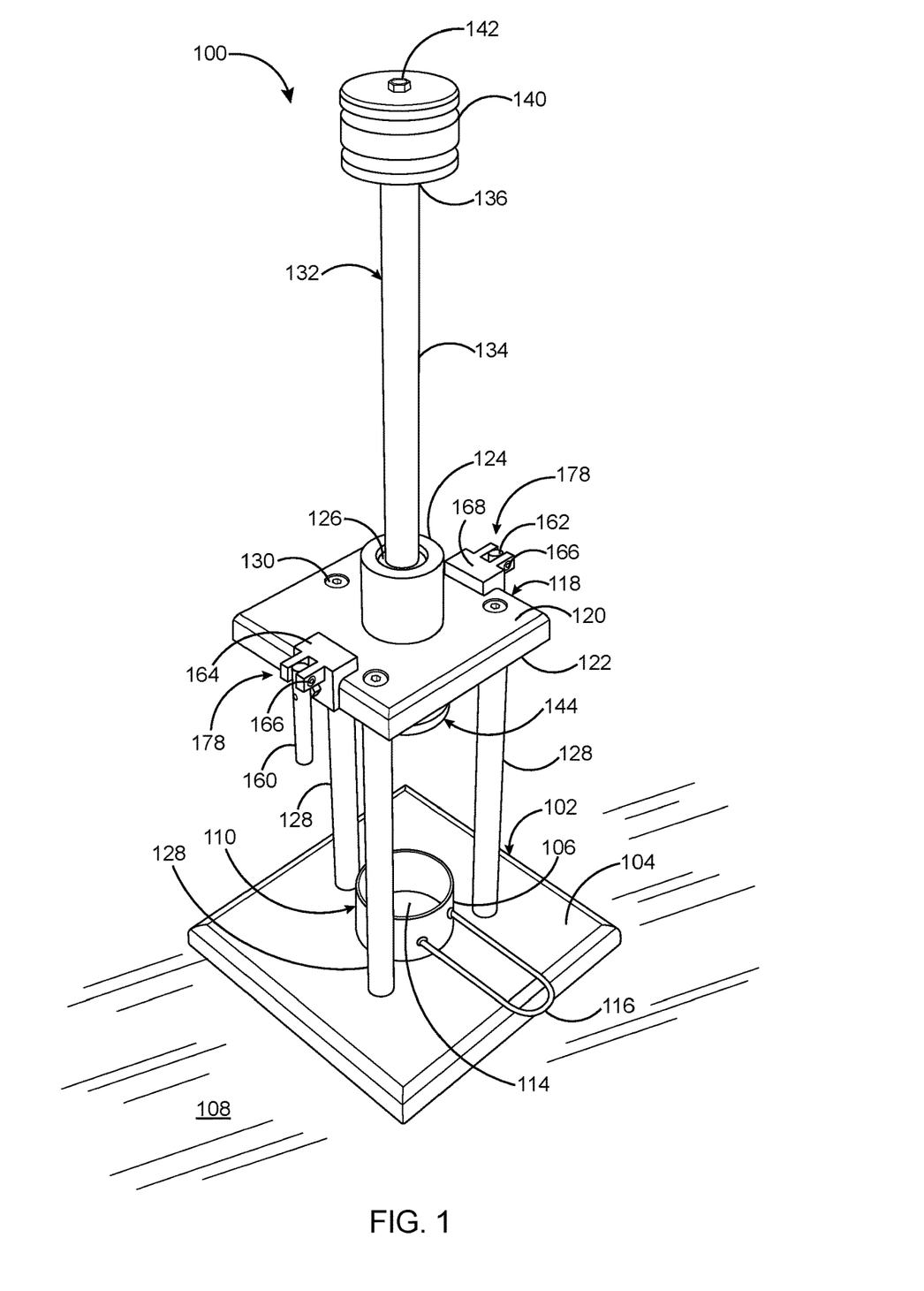
FIG. 1 illustrates a perspective view of an apparatus for determining the hardness of a granular material in accordance with the preferred embodiment of the present invention.
Figure 2:
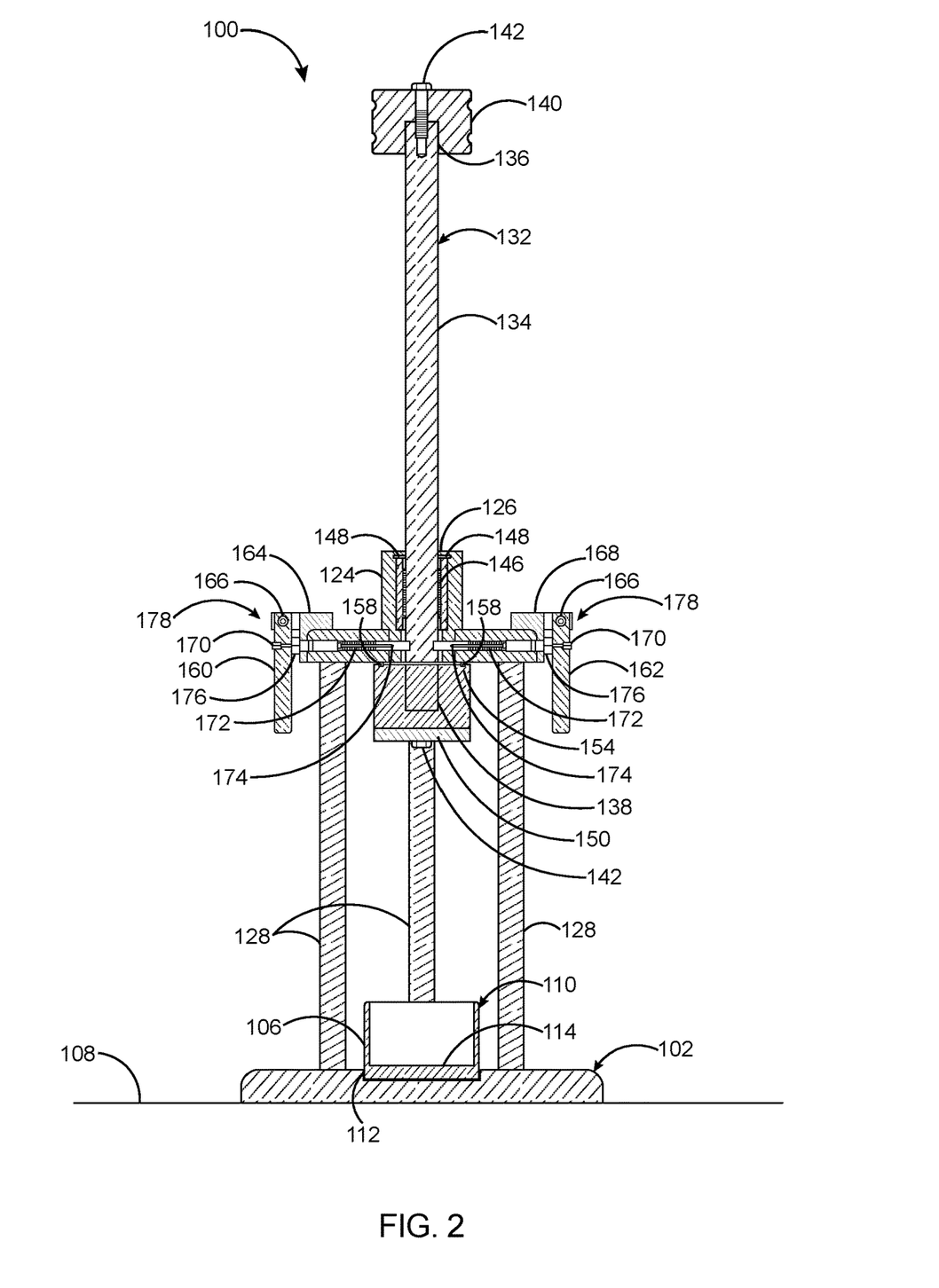
FIG. 2 illustrates a cross-sectional view of an apparatus for determining the hardness of a granular material in accordance with the preferred embodiment of the present invention.

Referring to FIGS. 1 and 2, an apparatus 100 for determining the hardness of a granular material in accordance with the preferred embodiment of the present invention is illustrated. The granular material is selected from a group consisting of: rocks, mineral rocks, gravel, cobblestones and rock fragments. The apparatus can be employed to determine the hardness of the granular material preferably, rock extracted from an ore. The apparatus comprises a base plate member 102, a sample cup 110, an upper plate member 118, a crusher assembly 132 and a crusher hammer release mechanism 178. The base plate member 102 includes an upper surface 104 having a recess 112 thereon. The base plate member 102 is placed over a flat surface 108 for use. The sample cup 110 is placed in the recess 112 on the upper surface 104 of the base plate member 102 to hold the sample of the granular material to be crushed. The sample cup 110 includes a handle 116 attached to a cup portion 106 having a flat base 114 that fits into the recess 112 on the upper surface 104 of the base plate member 102. The flat base 114 of the sample cup 110 is a hardened steel plate which is replaceable. The sample cup 110 has a dimension large enough to prevent the sample granular material from spilling from the sample cup 110 during breakage of the granular material. The handle 116 enables a user to easily remove the sample cup 110 from the base plate member 102 after use, to empty the sample cup 110 and insert a new sample to be broken into the apparatus 100.

The upper plate member 118 includes a top surface 120, a bottom surface 122 and a conduit 124 attached to the top surface 120 at a borehole 126 formed therethrough. The upper plate member 118 is positioned above the base plate member 102 and separated from the base plate member 102 utilizing at least one separator post 128. The at least one separator post 128 is fastened at the bottom surface 122 of the upper plate member 118 and at the upper surface 104 of the base plate member 102 utilizing at least one first fastening means 130. The at least one first fastening means 130 can preferably, be a 3.75-inch alloy steel shoulder bolt. The upper plate member 118 and base plate member 102 are hardened steel plates with impact points which are replaceable.

The crusher assembly 132 includes a crusher shaft 134 having an upper end 136 and a lower end 138, a crusher weight 140 fastened to the upper end 136 of the crusher shaft 134, a crusher hammer 144 fastened to the lower end 138 of the crusher shaft 134 and a linear roller bearing 140 with a retaining ring 148 positioned inside the conduit 124. The crusher hammer 144 is fastened to the lower end 138 of the crusher shaft 134 using at least one second fastening means 142. Preferably, the at least one second fastening means 142 is a hex cap screw. The crusher shaft 134 is slidably received in and engaged through the conduit 124 using the linear roller bearing 146 and the retaining ring 148 in such a way that the crusher weight 140 is positioned above the top surface 120 of upper plate member 118 and the crusher hammer 144 is positioned below the bottom surface 122 of the upper plate member 118. The crusher hammer 144 is attached to a crusher hammer head 150 using at least one third fastening means 152. Preferably, the at least one third fastening means 152 is hexagonal socket flat countersunk head cap screw. A cushion ring 158 is positioned between the crusher hammer cap 154 and the upper plate member 118 to reduce the noise formed when the crusher shaft 134 slides along the linear roller bearing 146.

The crusher hammer release mechanism 178 includes a pair of levers 160, 162 operably connected to a latch cable 170 having a latch pin 174 that runs through a compression spring 172. The pair of levers 160, 162 includes a first lever 160 attached to one side of the upper plate member 118 using a first lever bracket 164 and a second lever 162 attached to other side of the upper plate member 118 using a second lever bracket 168. The first lever 160 is attached to the first lever bracket 164 using at least one fourth fastening means 166 and the first lever bracket 164 is attached to one side of the upper plate member 118 using at least one fifth fastening means 176. The second lever 162 is attached to the second lever bracket 168 using the at least one fourth fastening means 166 and the second lever bracket 168 is attached to the other side of the upper plate member 118 using the at least one fifth fastening means 176. Preferably, the at least one fourth fastening means 166 is a hexagonal socket head cap screw and the at least one fifth fastening means 176 is a unified bolt thread coarse (UNC) modified bored hex bolt. When the pair of crusher levers 160, 162 is pulled simultaneously, the latch cable 170 actuated by the compression spring 172 enables the crusher shaft 134 to slide through the conduit 124 making the crusher hammer 144 to strike the sample of the granular material placed in the sample cup 110 and thereby crushing the sample of the granular material into smaller particles. The crusher hammer release mechanism 178 provides a quick release mechanism that allows the release of the crusher hammer 144 from a set height. The linear roller bearing 146 is configured to enable easy sliding of the crusher shaft 134 when the pair of crusher levers 160, 162 is pulled simultaneously. The crusher hammer release mechanism 178 provides the quick release mechanism to allow the release of the crusher hammer 144 such that it impacts the granular materials from the set height under the force of Earth's gravity. Pulling on either of the pair of levers 160, 162 individually will not release the crusher hammer 144 to fall, which is a design safety feature of the apparatus 100. The crusher shaft 134 provides a guide mechanism to ensure the crusher hammer 144 impacts the granular materials almost centrally. The apparatus 100 provides the measurement of residual rest height of the crusher shaft 134 and rate at which the fine particles are produced at a set amount of specific energy.

Figure 3:
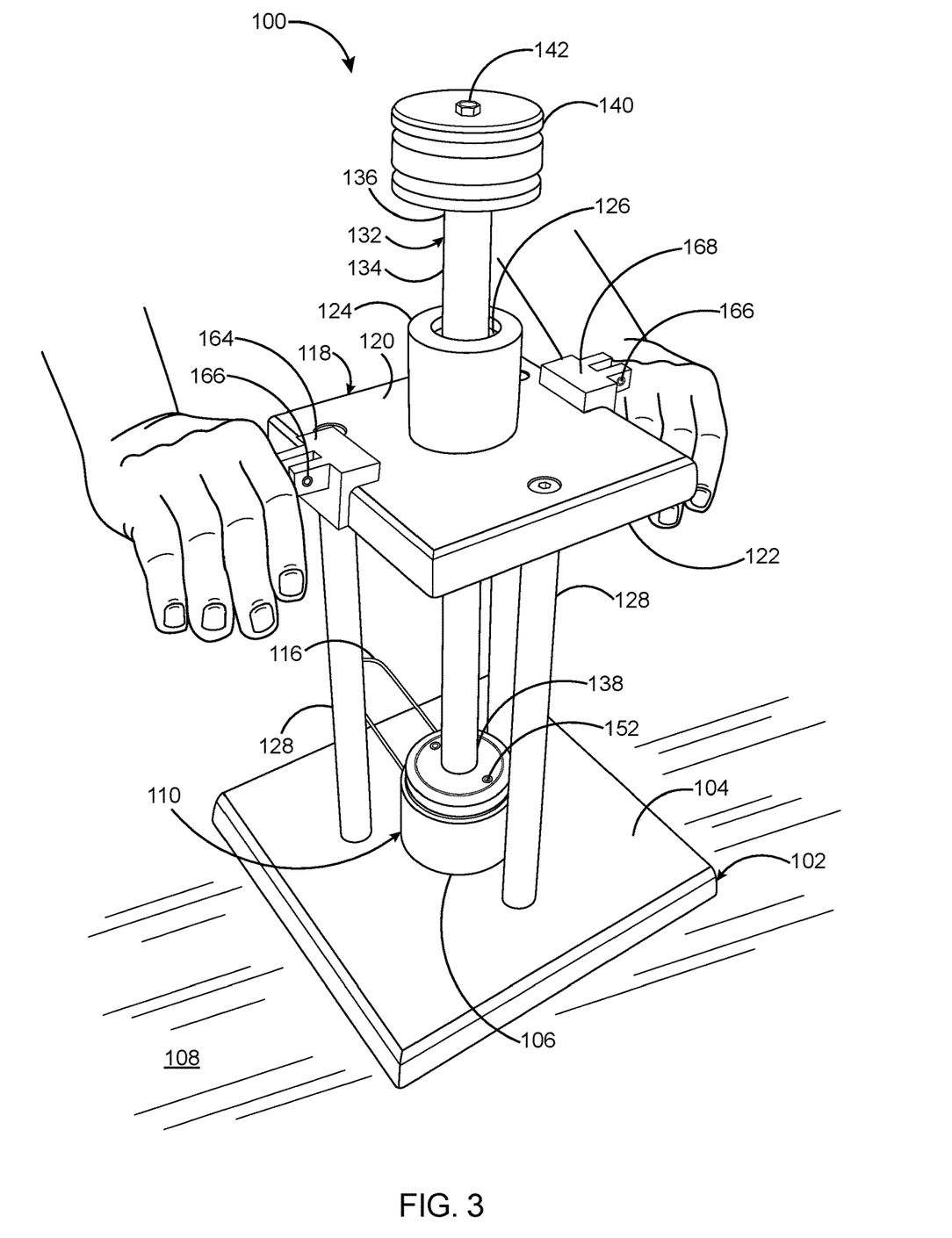
FIG. 3 illustrates a perspective view of an apparatus when in use in accordance with the preferred embodiment of the present invention.

FIG. 3 illustrates a perspective view of the apparatus 100 in use in accordance with the preferred embodiment of the present invention. Initially, the granular materials to be tested must first be pre-screened into a size fraction, and preferably hand sorted by mass to eliminate outliers. The granular material can be rocks extracted from the ore from a mine whose hardness is to be determined. The granular material may be derived either by post crushing of drill core extracted from the mine, sourced from pre-existing or blasted fragments from the mine site or generated from drilling of holes that would be loaded with explosives prior to blasting. The weight and size of each granular material used in the crushing operation is noted using at least one measuring unit. The granular material to be crushed is placed in the sample cup 110. The sample cup 110 containing the granular material is then positioned in the recess 112 on the upper surface 104 of the base plate member 102. Then, the pair of crusher levers 160, 162 is pulled simultaneously by the user to slide the crusher shaft 134 through the conduit 124 to drop the crusher hammer 144 on to the granular material thereby breaking the granular material into smaller particles. After the crushing operation, the crusher hammer 144 is lifted and locked into an engaged position using the latch pin 174. The crushed fine particles are removed from the apparatus 100 by the user by holding on the handle 116 of the sample cup 110. The weight of the crushed fine materials collected in the sample cup 110 is taken. After the crushed fine particles have been removed from the sample cup 110, the crushed fine particles are sorted according to the fineness of the materials. This is done by sieving the crushed fine particles using an appropriate sieve for about between 30 seconds to 3 minutes and preferably, about 60 seconds. Preferably, the sieve is 1/10th the size of the initial granular material crushed. For example, if the size of the initial rock used is 15 mm, and then the size of the sieve is 1.5 mm. Similarly, if the size of the initial rock used is 5 mm, and then the size of the sieve is preferably 0.5 mm.

The process is repeated for more sample fragments of the granular material. Preferably, the process is repeated for at least 10 times. For instance, 10 rocks are crushed to obtain an adequate representative sample of the hardness of the rock in the surrounding area from where the samples are taken. Preferably, the granular materials used for crushing are between 19 mm and 22.4 mm in size. The size of the granular materials may vary and in some embodiments may be between 5 mm and 25.4 mm. In certain embodiments, granular materials larger than 25.4 mm size may be used. In other embodiments larger granular materials may be used in association with a heavier crusher weight, or smaller granular materials may be used in association with a lighter crusher weight.

The crushed smaller particles that are small enough to have passed through the sieve are termed as "undersize" finer particles and other crushed particles that are too large to pass through the sieve are termed as "oversize" particles. The oversize particles are then weighed and the weight of the undersize finer particles is calculated by subtracting the weight of the oversize particles from the total weight of granular materials placed in the cup.

The size distribution of the finer particles or fineness index ($t_{10}$) is calculated using the value of the mass of the undersize finer particles using the following equation:

$$t_{10} = 100 \times \frac{M_{u/size}}{M_{total}} \%$$

where: $M_{u/size}$ represents the mass of the undersize finer particles and $M_{total}$ represents the total mass of the granular material fed to the sample cup. Normally, $t_{10}$ is expressed in percentage. Generally, typical rocks will yield a $t_{10}$ of 3%-10%.

The preferred embodiment uses gravity as the source of the input breakage energy, in which the input energy is fixed by the height and mass of the total mass of the crusher assembly 132 (crusher hammer 144, crusher shaft 134 and crusher weight 140). The resulting specific energy depends on the mass of the granular material and is calculated using following equation:

$$Ecs = \frac{MgH}{m}$$

where M represents the mass of the crusher assembly (crusher hammer, crusher shaft and crusher weight) (in kg); g represents the gravitational constant (9.8 m/s²); H represents the height of the crusher hammer (in meters); and m represents the mass of the fragment of granular material in the sample cup. The unit of specific energy (Ecs) is J/Kg and can be converted to the units of kWh/t by dividing by 3600.

The hardness or breakage index (HDI) for the granular material is calculated using the following equation:

$$HDI = \frac{t_{10}}{Ecs}$$

where: $t_{10}$ represents the size distribution of the crushed finer particles or fineness index; and Ecs represents the mass specific breakage energy expressed in kWh/t.

The hardness index HDI has become well known in the mining industry as a reliable indicator of impact ore hardness, and essentially describes the rate at which fine particles are produced ($t_{10}$) for a set amount of specific energy (Ecs). The HDI is directly related to the widely known ore comminution test index, A*b. The index A*b has become well known in the mining industry as a reliable indicator of impact ore hardness, and essentially describes the rate at which fine particles of rocks are produced ($t_{10}$) for a set amount of specific energy (Ecs). The HDI is also expected to be correlated with standard measures of rock hardness used in geotechnical testing, including UCS (unconfined compressive strength) and Is50 (point load strength).

Figure 4A:
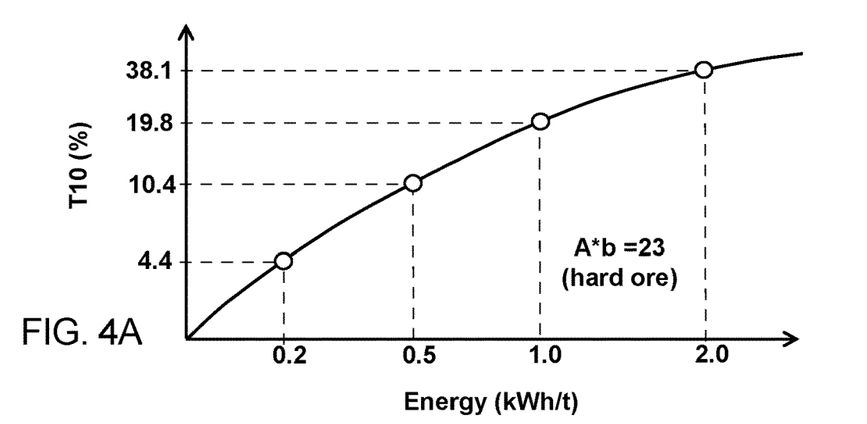
FIG. 4A illustrates a relationship between the fineness index ($t_{10}$) and the mass specific breakage energy Ecs expressed in kWh/t for a nominal 10 mm particle of a hard ore in accordance with the preferred embodiment of the present invention.
Figure 4B:
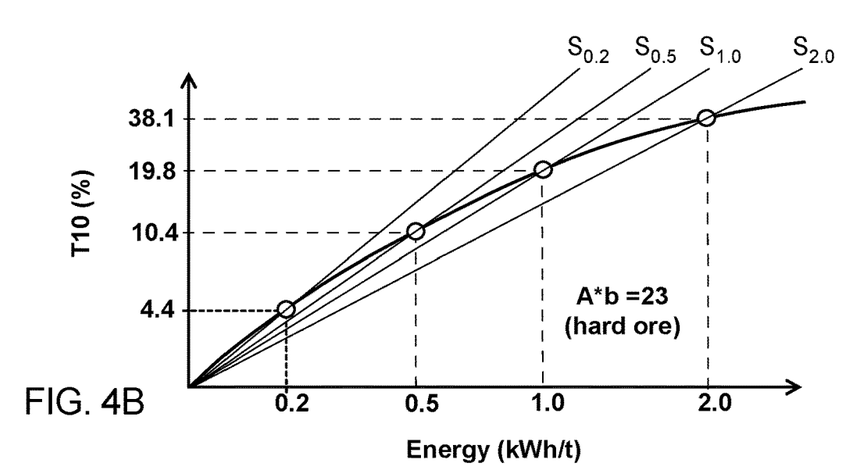
FIG. 4B illustrates the slopes of a hard ore at different values of specific breakage energy Ecs in accordance with the preferred embodiment of the present invention.

FIGS. 4A-4B illustrates the relationship between the fineness index ($t_{10}$) and the mass specific breakage energy Ecs expressed in kWh/t for a nominal 10 mm particle of a hard ore and the slopes at different values of specific breakage energy Ecs respectively in accordance with the preferred embodiment of the present invention. The hardness index HDI essentially describes the rate at which fine particles are produced ($t_{10}$) for a set amount of specific energy (Ecs). The hardness index HDI can be estimated from the slope of the curve of 'zero' input energy. The $t_{10}$ from a drop weight test conducted at a low input energy Ecs, provides a good approximation of the slope at zero energy as illustrated in FIG. 4A. At least 0.15 kWh/t (or 540 J/kg) is required to cause significant particle breakage and the most preferred energy is 0.2 kWh/t. In the preferred embodiment, a nominal size of 20.6 mm (22.4×19 mm fraction), the drop height of 25 cm and the crusher assembly (the crusher hammer, the crusher shaft and the crusher weight) mass of 4.53 kg are selected to deliver approximately 0.2 kWh/t. Clearly for smaller fragments, the specific energy would be higher (for example, ~0.6 kWh/t for 16×13.2 mm fraction). Hence the estimation of the slope at Ecs=0, would need to take into account the different Ecs, as the slopes at increasing specific energies would be lower, and would hence require greater corrections to align with the slope at Ecs=0 as illustrated in FIG. 4B.

The preferred embodiment provides the correction of the slope at any Ecs, based on the typical shape of the $t_{10}$ Vs Ecs response curve. This avoids the need to change the drop mass of the crusher hammer 144 to maintain the 0.2 kWh/t specific energy for any size tested. However, it may be possible for the user to select an appropriate crusher hammer 144 to suit the size fraction tested, in order to maintain consistency in the specific energy around 0.2 kWh/t and avoid the need to apply a significantly different mathematical correction. To ensure the data collected is accurate, the granular material selected should preferably conform to a narrow distribution around the mean mass for the group of particles in the sample. The slope at the actual test energy is calculated by correcting for the height offset of the crusher hammer 144 from the full 10 inches by the fact that the particle will not be fully squashed flat. That is, there will be a small residual height depending on initial rock size and hardness and estimating the slope (A*b) index at Ecs=0 for the actual test particle size, based on the Ecs applied. The final calculation step offers the user an estimate of the hardness of the granular material used by calculating the A*b index at the full DWT equivalent size of 32.6 mm, using the average size effect observed in drop weight test results. This factor can be changed if the user is aware of the actual size effect for rock type used. In certain embodiments, dedicated software is provided to assist the user with the mathematical calculations. The software may be web based, computer based or may be an app for use on a mobile device or tablet.

Figure 4C:
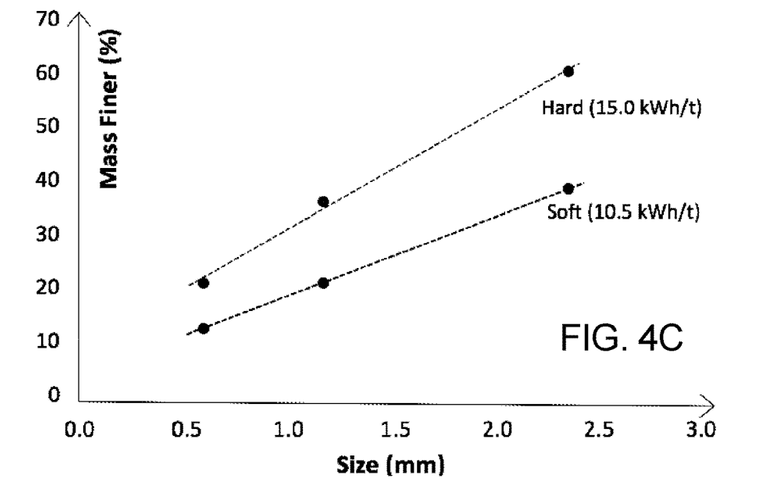
FIG. 4C illustrates that the slope of the product size distribution is related to the grindability nature of the feed sample.

By sizing the crushed fine broken material using multiple stacked screens, for example, 2.36, 1.18 and 0.600 mm, the slope of the resulting product size distribution (from 3 points) may be determined. The slope of the product size distribution is related to the grindability nature of the feed sample in ball mill grinding, widely known as the Bond Work Index, BMWI. This embodiment of the preferred method and apparatus is expected to require a higher specific energy (≥2 kWh/t) on smaller fragments, relevant to ball milling (say <10 mm). The slope of the size distribution of the broken material will be highly correlated with the Bond Work Index of the ore sample from which the fragments were removed for testing in the apparatus, as shown in FIG. 4C.

Figure 5:
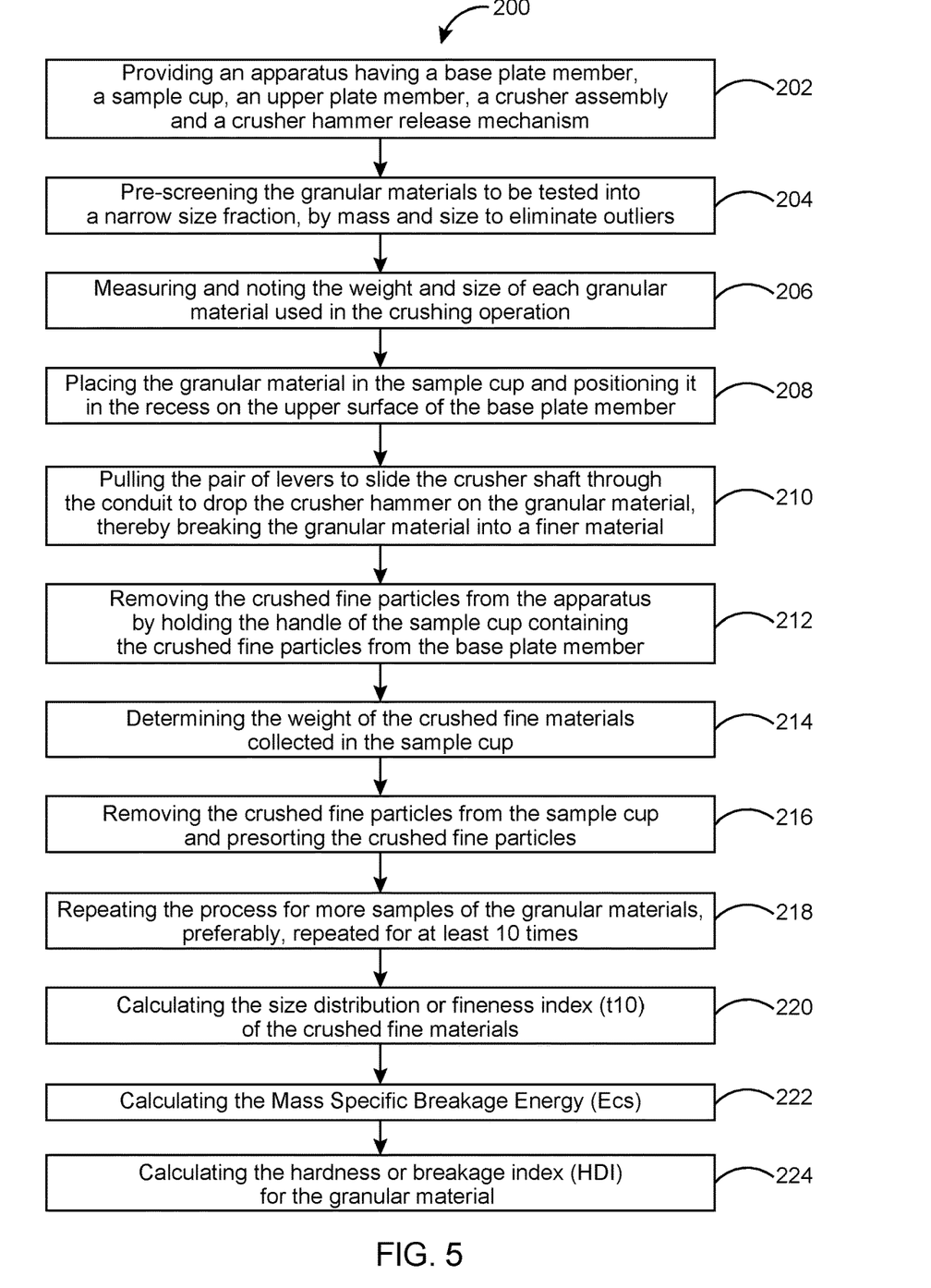
FIG. 5 illustrates a flow chart of a method for determining the hardness of the granular material in accordance with the preferred embodiment of the present invention.
Figure 6:
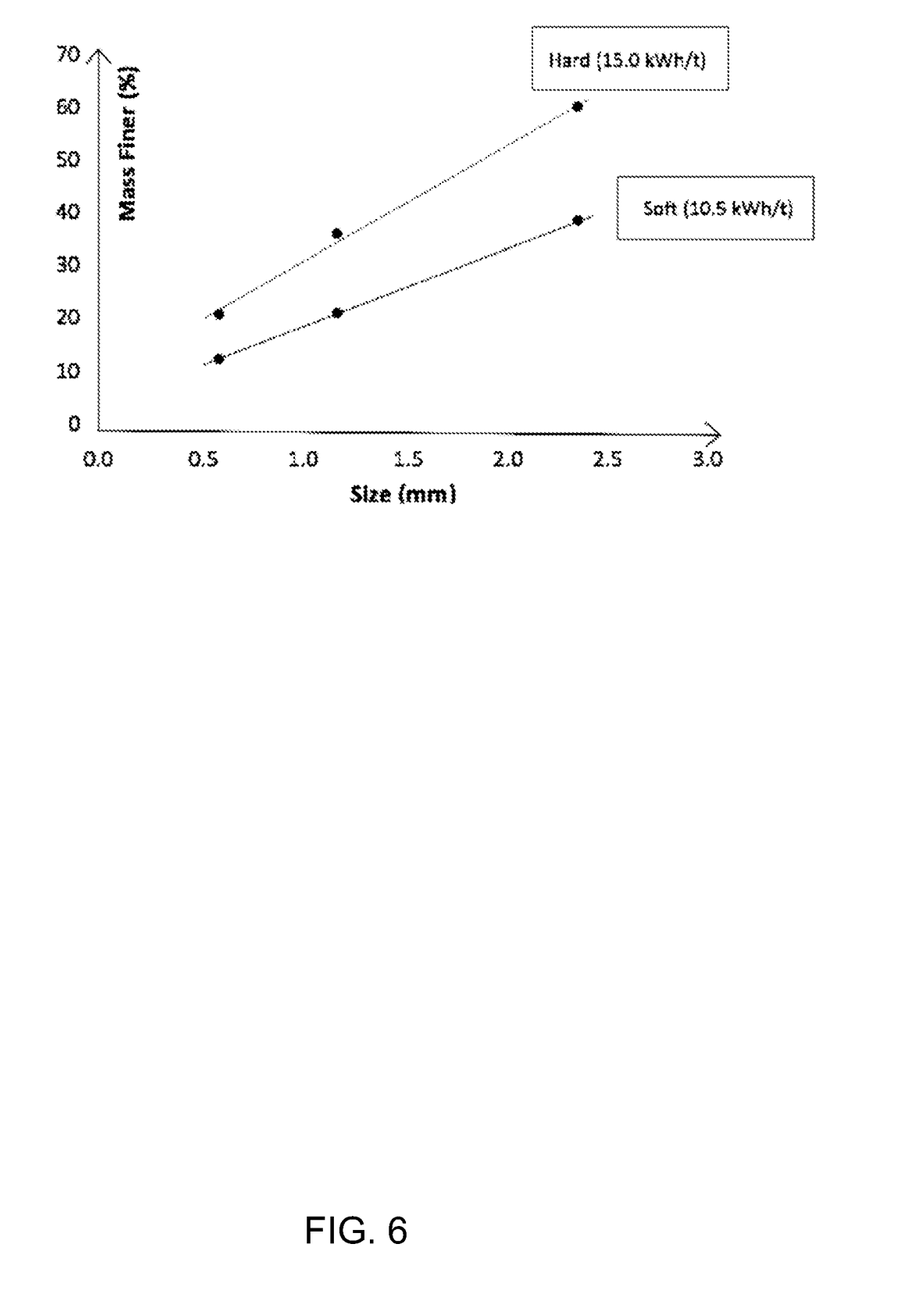
FIG. 6 is a graph with size on the X axis and mass finer (%) on the Y axis.

FIG. 5 illustrates a flow chart of a method 200 for determining the hardness of the granular material in accordance with the preferred embodiment of the present invention. The method 200 comprises the steps of: providing an apparatus having a base plate member, a sample cup, an upper plate member, a crusher assembly and a crusher hammer release mechanism as indicated in block 202. Pre-screening the granular materials to be tested into a narrow size fraction, by mass and size to eliminate outliers as indicated in block 204. Then as indicated in block 206, measuring and noting the weight and size of each granular material used in the crushing operation. Then placing the granular material in the sample cup and positioning the sample cup in the recess on the upper surface of the base plate member as indicated in block 208. Pull the pair of levers to slide the crusher shaft through the conduit to drop the crusher hammer on the granular material, thereby breaking the granular material into a finer material as indicated in 210. As indicated in block 212, manually lift the crusher shaft back to its starting position and remove the crushed fine particles from the apparatus by holding the handle of the sample cup containing the crushed fine particles from the base plate member. Then determining the weight of the crushed fine materials collected in the sample cup as indicated in block 214. Remove the crushed fine particles from the sample cup and presort the crushed fine particles according to the fineness of the materials by sieving the crushed fine particles using an appropriate sieve for about between 30 seconds and 3 minutes and preferably, 60 seconds, preferably, with a sieve of 1/10th the size of the initial rock crushed as indicated in block 216. Repeat the process for more samples of the granular materials, preferably, repeated for at least 10 times as indicated in block 218. As indicated in block 220, calculate the size distribution of the crushed fine materials (using multiple sieves) or fineness index ($t_{10}$) using the value of the mass of the undersize crushed fine materials on one sieve using the following equation:

$$t_{10} = 100 \times \frac{M_{u/size}}{M_{feed}} \%$$

where $M_{u/size}$ represents the mass of the undersize crushed fine materials smaller than a target sieve which is one tenth the size of the initial rock crushed and $M_{feed}$ represents the total mass of the granular material placed in the sample cup, the crushed fine material those that are small enough to have passed through the sieve are undersize and other crushed material too large to pass through the sieve are oversize. Then calculate the specific energy which depends on the mass of the granular material, gravity, the height and mass of the crusher hammer using the following equation:

$$Ecs = \frac{Mgh}{m}$$

where M represents a mass of the crusher hammer (in kilograms); g represents the gravitational constant (9.8 m/s$^2$); H represents a height of the crusher hammer above the base plate member (in meters); and m represents the mass of the granular material as indicated in the block 222 and calculating the hardness or breakage index (HDI) for the granular material using the following equation:

$$HDI = \frac{T_{10}}{Ecs}$$

where $t_{10}$ represents a size distribution of the crushed finer particles or fineness index and Ecs represents a mass specific breakage energy expressed in kWh/t as indicated in the block 224. The method 200 can be performed on a very small set of fragments from every drill core interval, at site, in parallel to assaying of the same samples. The method 200 of the present invention operates on the basis of a single impact test and takes less than 5 minutes to estimate the hardness index at point of testing thereby making it possible to process approximately 100 samples per working shift with appropriate sieving facilities. This method 200 is suitable for a wide range of particle size from 5 to 25 mm and may adjust the specific energy for custom applications outside the preferred design of 15 to 25 mm.

The present embodiment is a single shaft apparatus 100 of preferable mass less than 16 kg total and easily and conveniently transported to a point of testing without the need to send samples to a licensed laboratory for testing and data processing thereby saving time and shipping charges. The present apparatus 100 produces low noise, low dust due to low specific energy and does not require any additional power, compressed air or hydraulics to operate. The apparatus 100, applied in single impact mode on consecutive pre-screened fragments and combined with the one screen test post breakage of all fragments, takes less than 5 minutes to estimate the HDI for a sample of 10 to 20 fragments at point of testing and it is hence possible to process approximately 100 samples per working shift without undue effort. The preferred embodiment is suitable for a wide range of particle sizes (5 to 25 mm) and may include an adjustable specific energy for custom applications outside the preferred design (15 to 25 mm). The apparatus 100 includes a non-rock means of monitoring the consistency of the specific energy delivered to a specimen over time (via lead shot supplied with a very low diameter tolerance 0.44±0.005 inches).

In the preferred embodiment, the determination of hardness can be performed on a very small set of fragments from every drill core interval, at site, to quantify the variability, in parallel to assaying of the same samples. The rapid variability testing would precede selection of drill core samples for compositing and testing using standard hardness tests at licensed laboratories, a process not currently undertaken due to the absence of any such rapid, and inexpensive field testing devices.

The apparatus 100 may also be employed at a site for routine sample testing of feed to a mill, as a monitoring tool, or to check that the mill performance is in line with expectations based on historical trends.

In one embodiment, the hardness of fragments from drilling rejects of blast holes can be determined. The preferred embodiment has several potential advantages: 1) reconciliation of block model hardness estimates based on spatial estimates from sparse data in 3D space, generated from initial SMC testing on composite samples of drill core in deposit definition; 2) adjustment of cut-off grade based on grade and hardness of each hole, i.e., the material would be regarded as valuable ore not only if it has sufficient grade, but also if it can processed through the mill at a minimum required rate of production; 3) optimization of ore blending from different benches or achievement of blending at required production rate if an area is found to be too hard, but having sufficient grade; and 4) adjustment of explosive addition/strength to optimize powder factors, i.e., the final explosive loading is adjusted in respect to local hardness conditions, not at a constant level regardless of hardness variability in the pit.

The application of the preferred embodiment to drilling rejects is used in collaboration with assay service providers who have laboratories at site to carry out such work. Thus, the apparatus 100 can include an automated drop lifting and dis-engaging mechanism to alleviate the possibility of repetitive stress injuries to technicians employed to run a high volume testing each day.

The preferred method and apparatus 100 can be used for a higher energy breakage test (~2 kWh/t) on smaller fragments, relevant to ball milling (say <10 mm). By sizing the combined fine broken material at say three screens, for example, 1.7 0.85 and 0.425 mm, the slope of the resulting product size distribution (3 points) may be related to the grindability of the sample in a ball mill.

An alternative embodiment of the invention contemplates a wide variety of structural adaptations to the sample cup and the plate members, the number of linear roller bearings and energy levels according to the size of the granular materials. In certain embodiments, the sample of the granular materials can be placed and removed automatically.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for determining hardness of a granular material of a small sample taken from a drill site, the method comprising steps of:
   a) providing an apparatus having a base plate member, a sample cup, an upper plate member, a crusher assembly and a crusher hammer release mechanism;
   b) pre-screening granular materials to be tested into a narrow size traction to eliminate outliers by mass and size;
   c) recording the weight and size of each granular material used in the crushing operation;
   d) pacing the granular material in the sample cup;
   e) dropping the crusher hammer on the granular material, thereby breaking the granular material into a fine material;

f) determining weight of the fine material collected in the sample cup;
g) removing the fine material from the sample cup and presorting the fine material according to fineness of the materials by sieving the fine material;
h) calculating a size distribution of the fine material;
i) calculating specific energy $$Ecs = \frac{Mgh}{m}$$

where M represents a mass of the crusher hammer in kilograms; g represents the gravitational constant 9.8m/s$^2$; h represents a height of the crusher hammer above the base plate member in meters; and m represents the mass of the granular material fed to the sample cup; and j) calculating a granular material hardness HDI=where $t_{10}$ represents a size distribution of the fine material and Ecs represents a mass specific breakage energy expressed in kWh/t.

2. The method of claim 1 wherein the granular materials to be tested are between 5 to 25 mm in average diameter.

3. The method of claim 1 wherein the dropping step further comprises pulling a pair of levers to drop the crusher hammer.

4. The method of claim 1 wherein the sieving step comprising using a sieve of about 1/10th the size of the initial granular material crushed.

5. The method of claim 1 wherein steps (a)-(g) are repeated at least 5 times.

6. The method of claim 1 wherein steps (a)-(g) are repeated at least 10 times.

7. The method of claim 1 wherein size distribution of the fine material is calculated using multiple sieves.

8. The method of claim 1 wherein size distribution of the fine material is calculated using multiple sieves.

9. The method of claim 1 wherein size distribution of the crushed fine materials is calculated using a fineness index ($t_{10}$) using the value of the weight of undersize crushed fine materials on one sieve such that $$t_{10} = 100 \times \frac{M_{u/size}}{M_{feed}} \%$$

where $M_{u/size}$ represents mass of the undersize crushed fine materials smaller than a target sieve which is one tenth the size of the initial granular material crushed and $M_{feed}$ represents total mass of the granular material placed in the sample cup, wherein the undersize crushed fine materials are those that are small enough to have passed through the sieve while oversized crushed fine materials are those crushed materials too large to pass through the sieve.

10. An apparatus for determining hardness of a granular material, the apparatus comprising;
a base plate member having an upper surface with a recess thereon;
a sample cup having a flat base, the sample cup holding a sample of a granular material to be crushed and positioned in the recess on the upper surface of the base plate member;
an upper plate member having a top surface, a bottom surface and a conduit attached to the top surface at a borehole formed therethrough, the upper plate member positioned above the base plate member and separated from the base plate member;
a crusher hammer positioned below the bottom surface of the upper plate member; and
a crusher hammer release mechanism for crushing the granular material into finer particles; whereby the apparatus allows rapid testing of granular material breakage under high-energy, single-impact and low-energy repetitive impact conditions wherein a hardness index (HDI) of the granular material $$HDI = \frac{t_{10}}{Ecs}$$

where $t_{10}$ is a fineness index representing a size distribution of the finer particles, and Ecs represents a mass specific breakage energy expressed in kWh/t.

11. The apparatus of claim 10 wherein a fineness index uses a value of a weight of undersize crushed fine materials on one sieve such that $$t_{10} = 100 \times \frac{M_{u/size}}{M_{feed}} \%$$

where $M_{u/size}$ represents a mass of undersize crushed fine materials smaller than a target sieve which is one tenth the size of the granular material and $M_{feed}$ represents a total mass of the granular material placed in the sample cup, wherein the undersize crushed fine materials are those that are small enough to have passed through the sieve.

12. The apparatus of claim 10 wherein Ecs depends on the mass of the granular material, gravity and the height and mass of the crusher hammer and can be determined using the equation:

$$Ecs = \frac{Mgh}{m}$$

where M represents a mass of the crusher hammer in kilograms; g represents the gravitational constant 9.8m/s$^2$; h represents a height of the crusher hammer above the base plate member in meters; and m represents the mass in kilograms of the granular material.

13. The apparatus of claim 10 wherein the crusher hammer release mechanism provides a quick release mechanism to allow the release of the crusher hammer such that it impacts the granular material from a set height under the force of gravity.

14. The apparatus of claim 10 wherein the crusher hammer release mechanism comprises a pair of levers operably connected to a latch cable having a latch pin that runs through a compression spring, the pair of levers including a first lever attached to one side of the upper plate member using a first lever bracket and a second lever attached to a second side of the upper plate member using a second lever bracket, and wherein the latch cable is actuated by the compression spring when the pair of levers is pulled simultaneously.

15. The apparatus of claim 14 wherein either lever alone cannot release the crusher hammer to fall.

16. An apparatus for determining hardness of a granular material, the apparatus comprising:

a base plate member having an upper surface with a recess thereon;

a sample cup that includes a handle attached to a cup portion having a flat base, the sample cup holding a sample of the granular material to be crushed and positioned in the recess on the upper surface of the base plate member;

an upper plate member having a top surface, a bottom surface and a conduit attached to the top surface at a borehole formed therethrough, the upper plate member positioned above the base plate member and separated from the base plate;

a crusher assembly that includes a crusher shaft having an upper end and a lower end, a crusher weight fastened to the upper end of the crusher shaft, a crusher hammer fastened to the lower end of the crusher shaft and a linear roller bearing with a retaining ring; and a crusher hammer release mechanism that includes a pair of levers operably connected to a latch cable having a latch pin that runs through a compression spring, the pair of levers includes a first lever attached to one side of the upper plate member using a first lever bracket and a second lever attached to other side of the upper plate member using a second lever bracket;

whereby the apparatus allows rapid testing of granular material breakage under high-energy, single-impact and low-energy repetitive impact conditions, provides an accurate rate at which smaller particles are produced at a set amount of specific energy and a hardness index (HDI) of the granular material $$HDI = \frac{t_{10}}{Ecs}$$

where $t_{10}$ is a fineness index representing a size distribution of the crushed smaller particles; and Ecs represents a mass specific breakage energy expressed in kWh/t.

17. The apparatus of claim 16 wherein the fineness index uses a value of a weight of undersize crushed fine materials on one sieve such that $$t_{10} = 100 \times \frac{M_{u/size}}{M_{feed}} \%$$

where $M_{u/size}$ represents a mass of the undersize crushed fine materials smaller than a target sieve which is one tenth the size of the granular material and $M_{feed}$ represents a total mass of the granular material placed in the sample cup, wherein the undersize crushed fine materials are those that are small enough to have passed through the sieve.

18. The apparatus of claim 16 wherein Ecs depends on the mass of the granular material, gravity and the height and mass of the crusher hammer according to $$HDI = \frac{t_{10}}{Ecs}$$

where M represents a mass of the crusher hammer in kilograms; g represents the gravitational constant 9.8m/s$^2$; h represents a height of the crusher hammer above the base plate member in meters and m represents a mass of the granular material in kilograms.

19. The apparatus of claim 16 wherein the linear roller bearing with the retaining ring is configured to slidably engage the crusher shaft through the conduit with the crusher weight being positioned above the top surface of the upper plate member and the crusher hammer being positioned below the bottom surface of the upper plate member.

20. The apparatus of claim 16 wherein when the pair of levers is pulled simultaneously, the latch cable is actuated by the compression spring which enables the crusher shaft to slide through the conduit thereby crushing the sample of the granular material placed in the sample cup into smaller particles.

21. The apparatus of claim 16 wherein the lever mechanism provides a quick release mechanism to allow the release of the crusher hammer such that it impacts the granular materials from a set height under the force of gravity.

22. The apparatus of claim 16 wherein pulling on either of the pair of levers individually does not release the crusher hammer to fall which provides a safety feature to the apparatus.

* * * * *